United States Patent
Shen et al.

(10) Patent No.: US 12,160,466 B2
(45) Date of Patent: Dec. 3, 2024

(54) FIWI NETWORK LOAD BALANCING METHOD AND SYSTEM BASED ON EDGE COMPUTING

(71) Applicant: SOOCHOW UNIVERSITY, Suzhou (CN)

(72) Inventors: Gangxiang Shen, Suzhou (CN); Xinyu Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/911,390

(22) PCT Filed: Oct. 12, 2021

(86) PCT No.: PCT/CN2021/123240
§ 371 (c)(1),
(2) Date: Sep. 13, 2022

(87) PCT Pub. No.: WO2023/050469
PCT Pub. Date: Apr. 6, 2023

(65) Prior Publication Data
US 2024/0223648 A1  Jul. 4, 2024

(30) Foreign Application Priority Data
Sep. 28, 2021 (CN) .......................... 202111143910.1

(51) Int. Cl.
*G06F 9/50* (2006.01)
*H04L 67/00* (2022.01)
(Continued)

(52) U.S. Cl.
CPC ........ *H04L 67/101* (2013.01); *H04L 67/1012* (2013.01)

(58) Field of Classification Search
CPC ...... H04L 45/28; H04L 45/22; H04W 28/085; H04W 24/02; H04W 4/70
See application file for complete search history.

(56) References Cited

U.S. PATENT DOCUMENTS

| 10,104,039 B1 | 10/2018 | Knecht et al. | |
| 2015/0339412 A1* | 11/2015 | Vitaletti | G06Q 10/06 703/1 |

FOREIGN PATENT DOCUMENTS

| CN | 104283804 A | 1/2015 |
| CN | 110300024 A | 10/2019 |

(Continued)

OTHER PUBLICATIONS

Splunk, How to calculate the percentage bandwidth utilization, Aug. 2015, https://community.splunk.com/t5/Getting-Data-In/how-to-calculate-the-percentage-bandwidth-utilization-for-both/m-p/176799 (Year: 2015).*

(Continued)

*Primary Examiner* — Nicholas R Taylor
*Assistant Examiner* — Ho T Shiu
(74) *Attorney, Agent, or Firm* — SZDC Law PC (57) ABSTRACT

The present invention provides a FiWi network load balancing method and system based on edge computing. The method includes the following steps: establishing a path protection (PP) scheme; establishing a server protection (SP) scheme; and establishing a load balancing protection (LBP) scheme: when protection is provided for a user service, separately calculating and comparing network resource utilizations when the PP scheme and the SP scheme are performed for the service, and selecting a scheme with the lower network resource utilization to provide a service to the user service. The present invention can effectively restore a MEC service and reduce both a maximum MEC server load and consumption of protection bandwidth resources in a (Continued)

network, thereby implementing a balance between a resource load of a server and a traffic load of an optical fiber link.

9 Claims, 4 Drawing Sheets

(51) Int. Cl.
*H04L 67/101* (2022.01)
*H04L 67/1012* (2022.01)
*H04W 28/02* (2009.01)
*H04W 28/08* (2023.01)

(56) References Cited

FOREIGN PATENT DOCUMENTS

| | | | | |
|---|---|---|---|---|
| CN | 111770477 A | * | 10/2020 | ............. H04L 45/28 |
| CN | 113179331 A | | 7/2021 | |

OTHER PUBLICATIONS

Ning Wang et al., "MixCo: Optimal Cooperative Caching for Mobile Edge Computing in Fiber-Wireless Access Networks" 2018 Optical Fiber Communications Conference and Exposition (OFC) (Jun. 14, 2018).

Tong Wang, "Protection strategies for mobile edge computing network" Master's Thesis, Soochow University (Feb. 15, 2021).

* cited by examiner

FIWI NETWORK LOAD BALANCING METHOD AND SYSTEM BASED ON EDGE COMPUTING

This application is the National Stage Application of PCT/CN2021/123240, filed on Oct. 12, 2021, which claims priority to Chinese Patent Application No. 202111143910.1, filed on Sep. 28, 2021, which is incorporated by reference for all purposes as if fully set forth herein.

FIELD OF THE INVENTION

The present invention relates to the field of communication technologies, and specifically to a FiWi network load balancing method and system based on edge computing.

DESCRIPTION OF THE RELATED ART

Fiber-wireless (FiWi) access networks show tremendous advantages due to the combination of optical fiber and wireless communication technologies. Meanwhile, as an emerging 5G key technology, mobile edge computing (MEC) pushes services and network functions originally located in cloud data centers to the edge of mobile networks by combining IT service environments with cloud computing capabilities at the edge of networks, to provide computing, storage, and communication resources at the edge of the mobile networks, thereby meeting the requirements of emerging applications, enhancing user experience, and building smarter mobile networks. In a scenario in which MEC services are not supported, all data requests and computing services of users need to be completed in a large-scale data center at a remote end. This increases both the transmission delay of services and the transmission bandwidth required for the transfer of services between users and the large-scale data center. After edge data centers are deployed on access network nodes, all data requests and computing resource requirements of users may be obtained from these edge data centers, thereby greatly shortening the feedback delay of services. In addition, since it is not necessary to obtain data or computing resources from a distant large-scale data center, a waste of bandwidth resources due to round-trip transmission can be avoided, so that the use efficiency of network bandwidth resources can be greatly improved while user experience is improved.

Currently, the research on MEC is focused on data caching, computing migration, and architecture. There is still very scarce research on the survivability of FiWi networks supporting MEC services. Especially, when a wireless base station (BS) fails, corresponding MEC services are no longer available to users, thus affecting the user experience. How to restore MEC services for users becomes a major problem. For a server with a heavy load, when the demand for MEC resources for a local service of the server increases, the server cannot provide sufficient resources to meet the demand, resulting in congestion of services. Therefore, it is necessary to consider load balancing among MEC servers. In addition, the access to remote servers should be prevented from consuming excessive extra bandwidths, and it needs to be considered to minimize a network protection bandwidth. Although MEC services of users can be restored in conventional protection schemes, it is difficult to implement a balance between a load indicator and a resource consumption indicator because the use of a single protection scheme for all services of users leads to problems such as excessive load of MEC servers and excessive consumption of protection bandwidth resources in a network.

SUMMARY OF THE INVENTION

An objective of the present invention is to provide a FiWi network load balancing method and system based on edge computing, which can effectively restore a MEC service and reduce both a maximum MEC server load and consumption of protection bandwidth resources in a network, thereby implementing a balance between a resource load of a server and a traffic load of an optical fiber link.

To resolve the foregoing technical problems, the present invention provides a FiWi network load balancing method based on edge computing, including the following steps:

establishing a path protection (PP) scheme: for a user service, searching for candidate protection paths satisfying a communication delay requirement with a local MEC server of the user service, and selecting a path with the shortest delay from candidate protection paths satisfying a service bandwidth to provide a service to the user service;

establishing a server protection (SP) scheme: for a user service, sorting all non-local MEC servers satisfying a communication delay requirement in ascending order of load, deleting a MEC server not capable of providing a sufficient MEC resource, and selecting a MEC server with the lowest load to provide a service to the user service;

defining a network resource utilization $\rho$:

$$\rho = R_{max}/R_{total} + B_{max}/B_{total},$$

where $R_{max}$ represents a maximum MEC server load of an entire network, $B_{max}$ represents a maximum use link bandwidth of the entire network, $R_{total}$ represents a total capacity of each MEC server, and $B_{total}$ represents a total capacity of each optical fiber link; and establishing a load balancing protection (LBP) scheme: when protection is provided for a user service, separately calculating and comparing network resource utilizations when the PP scheme and the SP scheme are performed for the service, and selecting a scheme with the lower network resource utilization to provide a service to the user service.

As a further improvement to the present invention, the establishing a PP scheme specifically includes the following steps:

for a user service, searching for k candidate protection paths satisfying a communication delay requirement with a local MEC server of the user service by using a shortest routing algorithm, and saving the k candidate protection paths in a candidate path list;

determining whether every candidate path has a sufficient bandwidth, and deleting a path not capable of providing a sufficient bandwidth from the candidate path list; and selecting a path with the shortest delay from the candidate path list as a protection path to provide a service to the user service.

As a further improvement to the present invention, the establishing an SP scheme specifically includes the following steps:

for a user service, sorting all non-local MEC servers satisfying a communication delay requirement in ascending order of load, and saving the sorted non-local MEC servers in a list;
deleting a MEC server not capable of providing a sufficient MEC resource from the list; and
selecting the first server in the list to provide a service to the user service.

As a further improvement to the present invention, the establishing an LBP scheme specifically includes the following steps:
a. taking a network topology G=(N,L), a user set C, and a service set $S_c$ of a user c∈C;
b. obtaining a service s∈$S_c$; and
c. attempting the PP scheme for the service s and obtaining a corresponding value of a network resource utilization ρ, denoted as $ρ_{PP,s}$; attempting the SP scheme for the service s and obtaining a corresponding value of the network resource utilization ρ, denoted as $ρ_{SP,s}$; and if $ρ_{PP,s}$<$ρ_{SP,s}$, using the PP scheme for the service s and recording $ρ_{PP,s}$, or otherwise using the SP scheme and recording $ρ_{SP,s}$.

As a further improvement to the present invention, the establishing an LBP scheme further includes the following steps:
d. determining whether all the services in $S_c$ are protected: if all the services are protected, performing a next step, or otherwise returning to step b to protect a next service; and
e. determining whether all services of all the users in C are protected; and if all the services are protected, terminating the process, and finding a final network resource utilization, or otherwise returning to step a to protect a next user.

As a further improvement to the present invention, the value of ρ in step c is updated after the PP scheme or the SP scheme is applied, and eventually a scheme with the smallest ρ is applied to provide protection for a user service.

A FiWi network load balancing system based on edge computing includes:
a PP scheme module, configured to: for a user service, search for candidate protection paths satisfying a communication delay requirement with a local MEC server of the user service, and select a path with the shortest delay from candidate protection paths satisfying a service bandwidth to provide a service to the user service;
an SP scheme module, configured to: for a user service, sort all non-local MEC servers satisfying a communication delay requirement in ascending order of load, delete a MEC server not capable of providing a sufficient MEC resource, and select a MEC server with the lowest load to provide a service to the user service;
an LBP scheme module, configured to: when protection is provided for a user service, separately calculate and compare network resource utilizations when the PP scheme module and the SP scheme module are selected for the service, and select a scheme module with the lower network resource utilization to provide a service to the user service,
where a network resource utilization ρ is:

$$ρ = R_{max}/R_{total} + B_{max}/B_{total},$$

where $R_{max}$ represents a maximum MEC server load of an entire network, $B_{max}$ represents a maximum use link bandwidth of the entire network, $R_{total}$ represents a total capacity of each MEC server, and $B_{total}$ represents a total capacity of each optical fiber link.

As a further improvement to the present invention, when the LBP scheme module provides protection for each service, attempts are simultaneously made with the PP scheme module and the SP scheme module to find respective corresponding values of ρ, the value of ρ is updated after a scheme module is applied, and eventually a scheme with the smallest value of ρ is applied to provide protection for a user.

As a further improvement to the present invention, the LBP scheme module is further configured to: determine whether all services in the network are protected: if all the services are protected, detect whether all services of all users in the network are protected, and if not, continue protecting an unprotected service by using the LBP scheme module.

As a further improvement to the present invention, it is detected whether all the services of all the users in the network are protected: if all the services are protected, the process is terminated, and a final network resource utilization is found, or otherwise, a next user continues to be protected by using the LBP scheme module.

Beneficial effects of the present invention: In consideration of the survivability of FiWi networks supporting MEC services, three protection schemes are proposed for restoring MEC services for users in the case of a failure of a single wireless BS. When a failure occurs in a single wireless BS in a network, an LBP scheme can effectively restore MEC services for user services while minimizing a maximum MEC server load and protection bandwidth resources in the network, and balance a resource load of the MEC server and a traffic load of an optical fiber link, thereby implementing load balancing.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
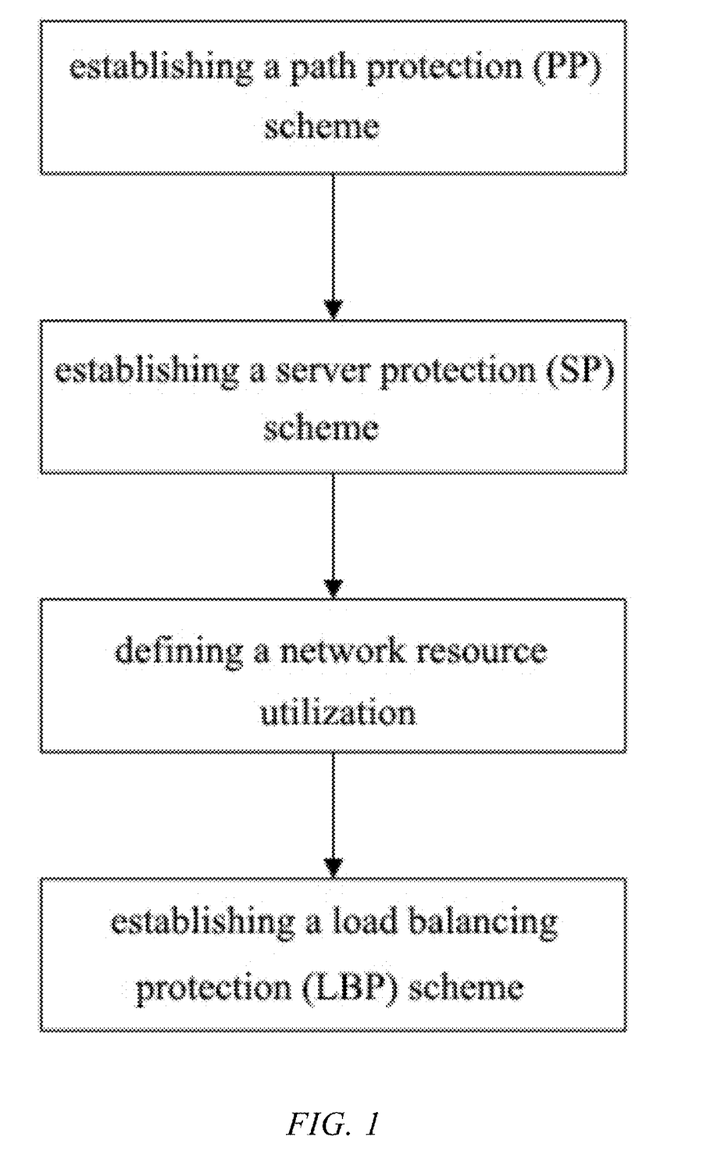
FIG. 1 is a schematic flowchart of a method according to the present invention.

Referring to FIG. 1, the present invention provides a FiWi network load balancing method based on edge computing, including the following steps:
establishing a PP scheme: for a user service, searching for candidate protection paths satisfying a communication delay requirement with a local MEC server of the user service, and selecting a path with the shortest delay from candidate protection paths satisfying a service bandwidth to provide a service to the user service;

establishing an SP scheme: for a user service, sorting all non-local MEC servers satisfying a communication delay requirement in ascending order of load, deleting a MEC server not capable of providing a sufficient MEC resource, and selecting a MEC server with the lowest load to provide a service to the user service; defining a network resource utilization ρ:

$$\rho = R_{max}/R_{total} + B_{max}/B_{total},$$

where $R_{max}$ represents a maximum MEC server load of an entire network, $B_{max}$ represents a maximum use link bandwidth of the entire network, $R_{total}$ represents a total capacity of each MEC server, and $B_{total}$ represents a total capacity of each optical fiber link; and establishing an LBP scheme: when protection is provided for a user service, separately calculating and comparing network resource utilizations when the PP scheme and the SP scheme are performed for the service, and selecting a scheme with the lower network resource utilization to provide a service to the user service.

The survivability of FiWi networks supporting MEC services is researched in the present invention. Three protection schemes are proposed for restoring MEC services for users in the case of a failure of a single wireless BS. When a failure occurs in a single wireless BS in a network, an LBP scheme can effectively restore MEC services for user services while minimizing a maximum MEC server load and protection bandwidth resources in the network, and balance a resource load of the MEC server and a traffic load of an optical fiber link, thereby implementing load balancing.

Embodiment 1

Figure 2:
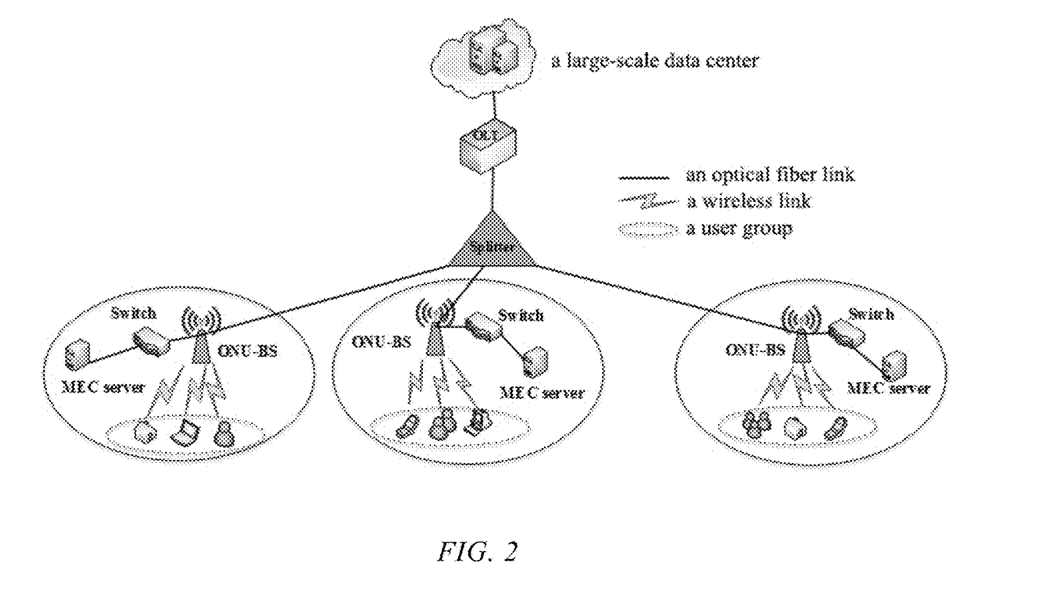
FIG. 2 is a schematic diagram of a FiWi network supporting MEC services.

FIG. 2 gives an example of a FiWi network supporting MEC services. The FiWi network is formed by one optical line terminal (OLT) and a plurality of optical network unit BSs (ONU-BSs). Each ONU-BS provides a communication service to a user service in a user group, and is connected to a local MEC server to provide MEC services.

However, as the complexity of 5G networks increases, upon the occurrence of a failure or under an attack, the service capability of a communication network is severely affected. This affects user experience and causes huge economic loss to network operators. Therefore, the survivability of the network is a major focus. In consideration of failures in wireless BSs, the wireless BSs are exposed in an external environment and are therefore prone to failures. In addition, when a failure occurs in a wireless BS in the network, even if nodes such as a MEC server and a switch and an optical fiber link are all intact, a user may lose a communication connection with a BS and loses corresponding MEC services. To resolve the problems causes by a failure, an LBP scheme is proposed based on two basic protection schemes, which can effectively restore a MEC service and reduce both a maximum MEC server load and consumption of protection bandwidth resources in a network, thereby implementing a balance between a resource load of a server and a traffic load of an optical fiber link, so that the network performance is improved.

In a normal case (without a network failure), a user is connected to the network through a wireless BS with the highest signal quality. If a failure occurs in the wireless BS, the user may be connected to a nearby backup BS to restore services. For example, in FIGS. 3, B1 and B2 are wireless BSs accessible to a user A. N1 is a MEC node of the user A. In a normal case, the user A is connected to a MEC server of N1 through B1 to obtain a service, and a corresponding communication path is A-B1-N1. If a failure occurs in B1, the wireless link A-B1 is interrupted. In this case, the user A cannot obtain a MEC service through the original communication path. To restore the MEC service of the user, two basic protection schemes may usually be considered: a PP scheme and an SP scheme.

(1) PP Scheme:

That is, a backup BS is used to reach the original MEC server. As shown by a path 1 in FIG. 3, a path of the restored service turns into A-B2-N2-N1 (a dotted line 1). A specific implementation includes: for each service of the user, searching for k candidate protection paths satisfying a communication delay requirement with a local MEC server of the user service by using a shortest routing algorithm, and saving the k candidate protection paths in a candidate path list; next, determining whether every candidate path has a sufficient bandwidth; deleting a path not capable of providing a sufficient bandwidth from the candidate path list; and finally, selecting a path with the shortest delay from the candidate path list as a protection path. It can be seen that in the PP scheme, resources in the original server are reused, and therefore it is not necessary to reserve backup MEC resources. A maximum MEC server load is kept from becoming excessively high, and the server is not prone to a phenomenon of load imbalance. However, because the user accesses the original MEC server through "bypassing", and a number of links may be covered. Therefore, extra communication resources may be consumed, the traffic load of an optical fiber link is relatively high, and the consumption of protection bandwidth resources in a network is relatively high.

(2) SP Scheme

That is, computing and storage resources are reserved on a non-local MEC server as a backup. As shown by a path 2 in FIG. 3, it is assumed that a server in N3 is selected as a backup server. A path of the restored service turns into A-B2-N2-N3 (a dotted line 2). A specific implementation solution includes: for each service of a user, sorting all non-local MEC servers satisfying a communication delay requirement in ascending order of load, and saving the sorted non-local MEC servers in a list; next, deleting a server not capable of providing a sufficient MEC resource from the list; and finally, selecting the first server in the list to provide a service to the user service. As can be seen in the SP scheme, if a backup MEC server is nearby, SP can save bandwidth resources of accessing a MEC service, the traffic load of an optical fiber link is low, and the consumption of protection bandwidth resources in a network is relatively low. However, in this case, extra backup MEC resources need to be reserved, the load of the MEC server is increased, a maximum MEC server load is very high, and the server is prone to a phenomenon of load imbalance.

In view of the advantages and disadvantages of the two basic solutions, a compromise protection scheme is expected, to avoid extreme phenomena that the maximum MEC server load is excessively high and the consumption of protection bandwidth resources in the network is excessively high. Therefore, the PP scheme and the SP scheme are combined to propose an LBP scheme to restore a MEC service, thereby effectively balancing a resource load of a MEC server and a traffic load of an optical fiber link, and balancing two performance indicators, that is, the maximum MEC server load and the protection bandwidth resources in the network.

(3) LBP Scheme

Figure 3:
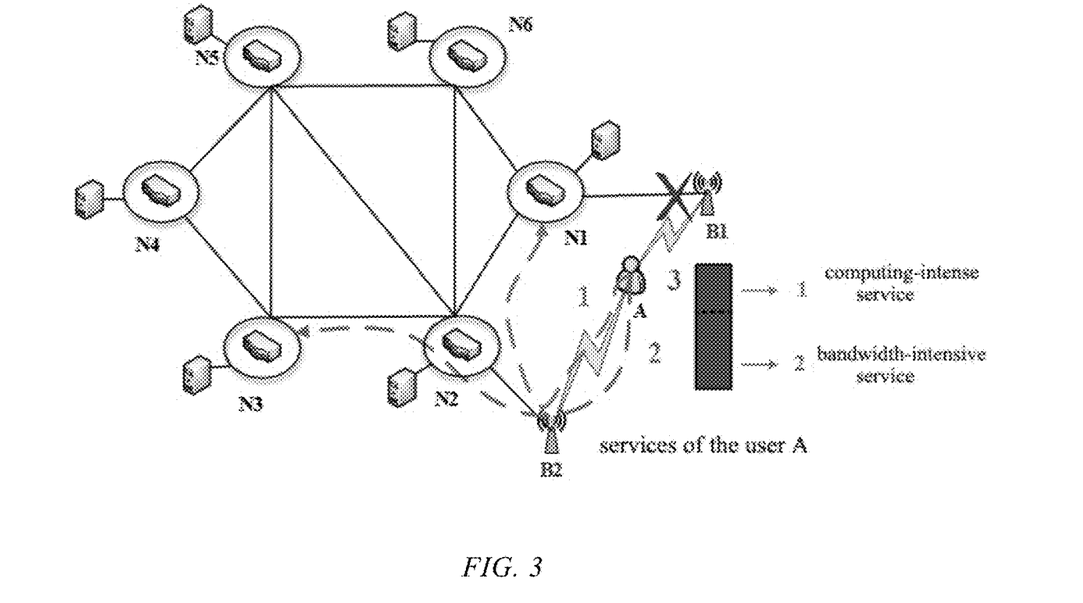
FIG. 3 is a schematic diagram of a protection scheme for a failure of a wireless BS according to the present invention.

As shown by a path 3 in FIG. 3, in the LBP scheme, different protection modes are provided for different services according to the current network resource utilization and characteristics of user services. Some services are protected by using the PP scheme, and some services are protected by using the SP scheme. The target is to use the PP scheme when a computing-intense service of the user A requires more MEC resources and use the SP scheme when a bandwidth-intensive service requires more bandwidth resources.

In a specific implementation solution, to balance a load of a MEC server and a capacity utilization of an optical fiber link, a parameter ρ is first defined, representing a network resource utilization. The value of the parameter is $\rho=R_{max}/R_{total}+B_{max}/B_{total}$. $R_{max}$ and $B_{max}$ are respectively a maximum MEC server load and a maximum use link bandwidth of an entire network. $R_{total}$ and $B_{total}$ are respectively a total capacity of each MEC server and a total capacity of each optical fiber link. When the value of ρ is smaller, it represents that server load imbalance and link traffic overload are less likely to occur, so that it is easier to implement load balancing, and the overall performance of the network is better. When protection is provided to each service of a user, the PP scheme and the SP scheme are both attempted to find the values of ρ corresponding to the schemes. The values of ρ is updated after the PP scheme and the SP scheme are applied, and eventually a scheme with the smallest ρ is used to provide protection for the user. An algorithm is specifically as follows:

inputs: a network topology G=(N, L), a user set C, and a service set $S_c$ of a user c∈C;

first step: taking one user c∈C;

second step: acquiring one service s∈$S_c$;

third step: attempting the PP scheme for the service s and obtaining a corresponding value of ρ, denoted as $\rho_{PP,s}$; attempting the SP scheme for s and obtaining a corresponding value of ρ, denoted as $\rho_{SP,s}$, and if $\rho_{PP,s}<\rho_{SP,s}$, using the PP scheme for the service s and recording $\rho_{PP,s}$, or otherwise using the SP scheme and recording $\rho_{SP,s}$;

fourth step: determining whether all the services in $S_c$ are protected: if not, returning to the second step to protect a next service, or otherwise, performing a fifth step; and fifth step: determining whether all services of all the users in C are protected; and if not, returning to the first step to protect a next user, or otherwise, terminating the process, and finding a final parameter ρ.

When a failure occurs in a single wireless BS in a network, the LBP scheme can effectively restore MEC services for user services while minimizing a maximum MEC server load and protection bandwidth resources in the network, and balance a resource load of the MEC server and a traffic load of an optical fiber link, thereby implementing load balancing.

Embodiment 2

Figure 4:
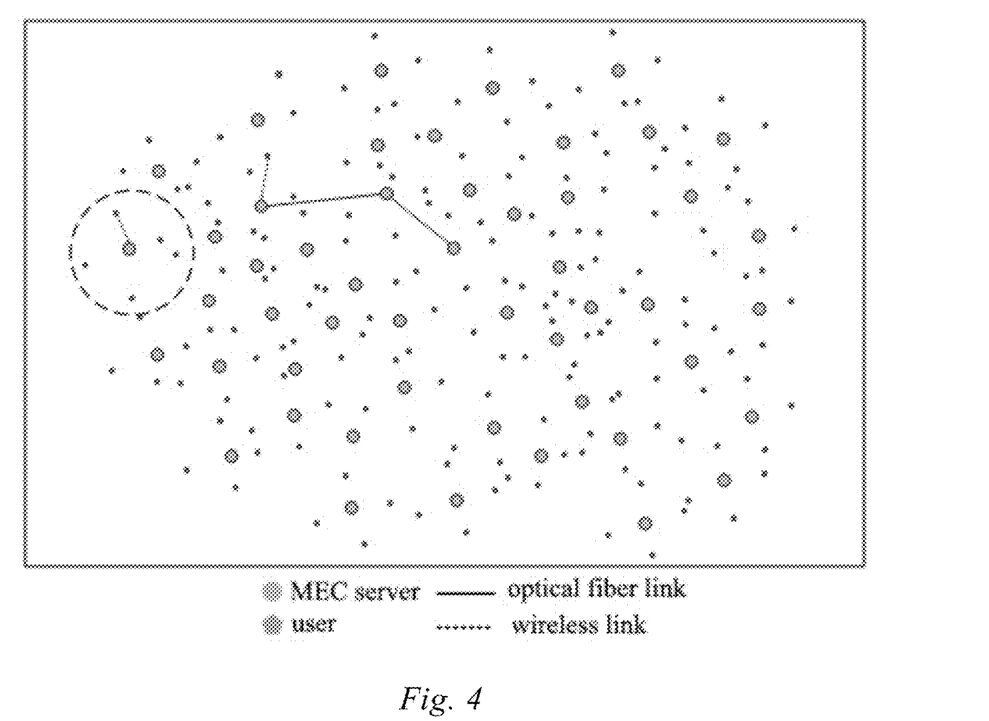
FIG. 4 is a schematic diagram of a test network according to Embodiment 2 of the present invention.

Based on the foregoing implementation and Embodiment 1, the performance of the proposed scheme is estimated in the test network shown in FIG. 4. The network has 50 MEC servers and 146 users. Specific simulation parameters are as follows:

(1) A maximum resource capacity of each MEC server is 800 units, and a maximum bandwidth capacity of each optical fiber link is 100 Gb/s.

(2) MEC resources required for each user are evenly distributed in [X−10, X+10] units. X is an average value of MEC resources required for each user, and bandwidth resources required for each user are evenly distributed at [1, 3] Gb/s.

(3) Each user has 100 MEC services. MEC resources and bandwidth resources of each user are randomly distributed to the 100 MEC services of the user.

(4) A delay constraint of each MEC service is randomly set within a range of [18, 22] ms. A switch delay of each switch is set to 8 ms. Because a distance range is very small, a signal propagation delay in the FiWi network is ignored.

Figure 5:
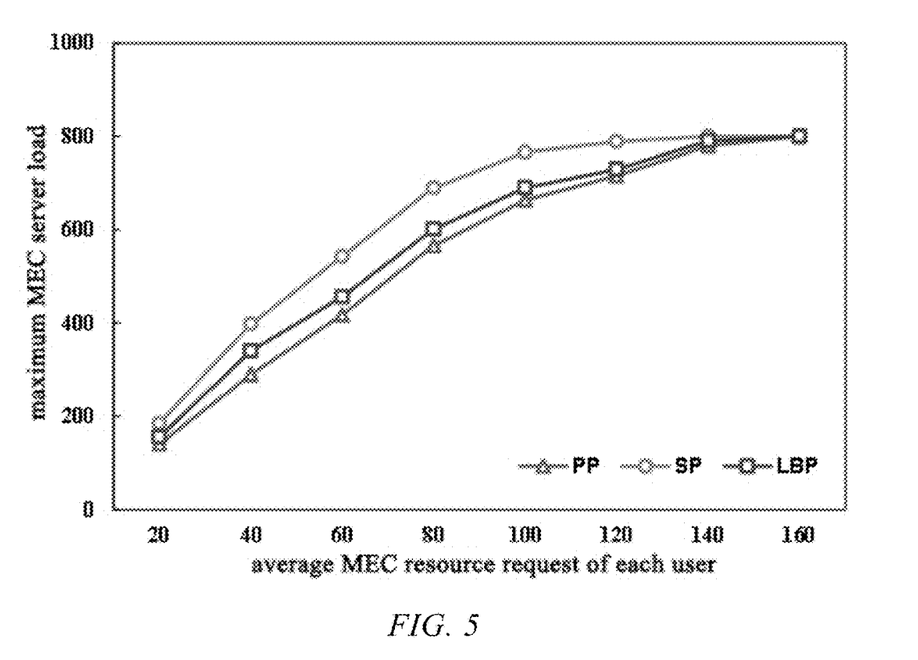
FIG. 5 is a schematic diagram of the simulation of a maximum MEC server load according to Embodiment 2 of the present invention.
Figure 6:
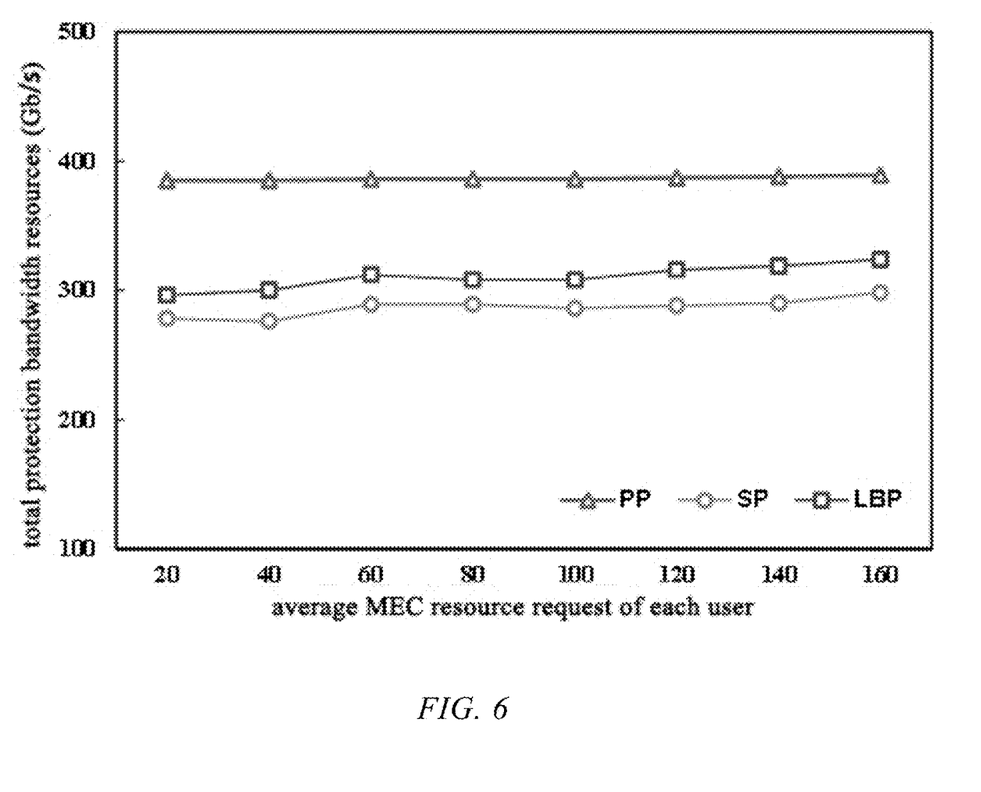
FIG. 6 is a schematic diagram of the simulation of a protection bandwidth resource according to Embodiment 2 of the present invention.

FIG. 5 shows a result of a maximum MEC server load, defined as a maximum server resource load in all servers. FIG. 6 shows a result of protection bandwidth resources in the network, defined as a total sum of protection bandwidth resources of all optical fiber links. Through the comparison of three schemes, it can be seen that the PP scheme implements the smallest maximum MEC server load, but requires the most protection bandwidth resources, because an original MEC server needs to be reached through bypassing. In comparison, the maximum MEC server load in the SP scheme is the highest, but consumes the least protection bandwidth resources, because extra MEC resources need to be reserved in other servers. Finally, the proposed LBP scheme most effectively implements a balance between the maximum MEC server load and the protection bandwidth resources. Specifically, this scheme approaches the maximum MEC server load of the PP scheme and the protection bandwidth resources of the SP scheme. The reason is that during protection, according to the current network resource utilization and characteristics of user services, the PP scheme and the SP scheme are attempted in the LBP scheme to provide most appropriate protection modes for different services. After each MEC service is protected by using the two schemes, the maximum MEC server load and the maximum link capacity utilization keep being recorded, and a better scheme is selected according to the value of ρ. Therefore, compared with the PP and the SP, the LBP scheme can effectively minimize both the maximum MEC server load and the protection bandwidth resources, to implement load balancing.

Embodiment 3

This embodiment of the present invention provides a FiWi network load balancing system based on edge computing, including:

a PP scheme module, configured to: for a user service, search for candidate protection paths satisfying a communication delay requirement with a local MEC server of the user service, and select a path with the shortest delay from candidate protection paths satisfying a service bandwidth to provide a service to the user service;

an SP scheme module, configured to: for a user service, sort all non-local MEC servers satisfying a communication delay requirement in ascending order of load, delete a MEC server not capable of providing a sufficient MEC resource, and select a MEC server with the lowest load to provide a service to the user service;

an LBP scheme module, configured to: when protection is provided for a user service, separately calculate and compare network resource utilizations when the PP scheme module and the SP scheme module are selected for the service, and select a scheme module with the lower network resource utilization to provide a service to the user service, where a network resource utilization ρ is:

$$\rho = R_{max}/R_{total} + B_{max}/B_{total},$$

where $R_{max}$ represents a maximum MEC server load of an entire network, $B_{max}$ represents a maximum use link bandwidth of the entire network, $R_{total}$ represents a total capacity of each MEC server, and $B_{total}$ represents a total capacity of each optical fiber link.

Further, when the value of ρ is smaller, it represents that server load imbalance and link traffic overload are less likely to occur, so that it is easier to implement load balancing, and the overall performance of the network is better. When the LBP scheme module provides protection for each service, attempts are simultaneously made with the PP scheme module and the SP scheme module to find respective corresponding values of ρ, the value of ρ is updated after a scheme module is applied, and eventually a scheme with the smallest value of ρ is applied to provide protection for a user. The LBP scheme module is further configured to: determine whether all services in the network are protected: if all the services are protected, detect whether all services of all users in the network are protected, and if not, continue protecting an unprotected service by using the LBP scheme module. It is detected whether all the services of all the users in the network are protected: if all the services are protected, the process is terminated, and a final network resource utilization is found, or otherwise, a next user continues to be protected by using the LBP scheme module.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A FiWi network load balancing method based on edge computing, comprising steps of:

establishing a path protection (PP) scheme: for a user service, searching for candidate protection paths satisfying a communication delay requirement with a local MEC server of the user service, and selecting a path with the shortest delay from candidate protection paths satisfying a service bandwidth to provide a service to the user service;

establishing a server protection (SP) scheme: for a user service, sorting all non-local MEC servers satisfying a communication delay requirement in ascending order of load, deleting a MEC server not capable of providing a sufficient MEC resource, and selecting a MEC server with the lowest load to provide a service to the user service;

defining a network resource utilization ρ:

$$\rho = R_{max}/R_{total} + B_{max}/B_{total},$$

wherein $R_{max}$ represents a maximum MEC server load of an entire network, $B_{max}$ represents a maximum use link bandwidth of the entire network, $R_{total}$ represents a total capacity of each MEC server, and $B_{total}$ represents a total capacity of each optical fiber link; and establishing a load balancing protection (LBP) scheme: when protection is provided for a user service, separately calculating and comparing network resource utilizations when the PP scheme and the SP scheme are performed for the service, and selecting a scheme with the lower network resource utilization to provide a service to the user service; and wherein the establishing the LBP scheme comprises steps of:

a. taking a network topology G=(N, L), a user set C, and a service set $S_c$ of a user c∈C;

b. obtaining a service s∈$S_c$; and c. attempting the PP scheme for the service s and obtaining a corresponding value of a network resource utilization ρ, denoted as $\rho_{PP,s}$; attempting the SP scheme for the service s and obtaining a corresponding value of the network resource utilization ρ, denoted as $\rho_{SP,s}$; and if $\rho_{PP,s} < \rho_{SP,s}$, using the PP scheme for the service s and recording $\rho_{PP,s}$, or otherwise using the SP scheme and recording $\rho_{SP,s}$.

2. The FiWi network load balancing method based on edge computing according to claim 1, wherein the establishing a PP scheme comprises steps of:

for a user service, searching for k candidate protection paths satisfying a communication delay requirement with a local MEC server of the user service by using a shortest routing algorithm, and saving the k candidate protection paths in a candidate path list;

determining whether every candidate path has a sufficient bandwidth, and deleting a path not capable of providing a sufficient bandwidth from the candidate path list; and selecting a path with the shortest delay from the candidate path list as a protection path to provide a service to the user service.

3. The FiWi network load balancing method based on edge computing according to claim 1, wherein the establishing an SP scheme comprises steps of:

for a user service, sorting all non-local MEC servers satisfying a communication delay requirement in ascending order of load, and saving the sorted non-local MEC servers in a list;

deleting a MEC server not capable of providing a sufficient MEC resource from the list; and selecting the first server in the list to provide a service to the user service.

4. The FiWi network load balancing method based on edge computing according to claim 1, wherein the establishing an LBP scheme further comprises steps of:

d. determining whether all the services in $S_c$ are protected: if all the services are protected, performing a next step, or otherwise returning to step b to protect a next service; and e. determining whether all services of all the users in C are protected; and if all the services are protected, terminating the process, and finding a final network resource utilization, or otherwise returning to step a to protect a next user.

5. The FiWi network load balancing method based on edge computing according to claim 1, wherein the value of ρ in step c is updated after the PP scheme or the SP scheme is applied, and eventually a scheme with the smallest ρ is applied to provide protection for a user service.

6. A FiWi network load balancing system based on edge computing, comprising:

a path protection (PP) scheme module, configured to: for a user service, search for candidate protection paths satisfying a communication delay requirement with a local MEC server of the user service, and select a path with the shortest delay from candidate protection paths satisfying a service bandwidth to provide a service to the user service;

a server protection (SP) scheme module, configured to: for a user service, sort all non-local MEC servers satisfying a communication delay requirement in ascending order of load, delete a MEC server not capable of providing a sufficient MEC resource, and select a MEC server with the lowest load to provide a service to the user service;

a load balancing protection (LBP) scheme module, configured to: when protection is provided for a user service, separately calculate and compare network resource utilizations when the PP scheme module and the SP scheme module are selected for the service, and select a scheme module with the lower network resource utilization to provide a service to the user service, wherein a network resource utilization $\rho$ is:

$$\rho = R_{max}/R_{total} + B_{max}/B_{total},$$

wherein $R_{max}$ represents a maximum MEC server load of an entire network, $B_{max}$ represents a maximum use link bandwidth of the entire network, $R_{total}$ represents a total capacity of each MEC server, and $B_{total}$ represents a total capacity of each optical fiber link;

wherein the LBP scheme module comprises a LBP scheme, and the LBP scheme is established by:

a. taking a network topology G=(N, L), a user set C, and a service set $S_c$ of a user $c \in C$;

b. obtaining a service $s \in S_c$; and c. attempting the PP scheme for the service s and obtaining a corresponding value of a network resource utilization $\rho$, denoted as $\rho_{PP,s}$; attempting the SP scheme for the service s and obtaining a corresponding value of the network resource utilization $\rho$, denoted as $\rho_{SP,s}$; and if $\rho_{PP,s} < \rho_{SP,s}$, using the PP scheme for the services and recording $\rho_{PP,s}$, or otherwise using the SP scheme and recording $\rho_{SP,s}$.

7. The FiWi network load balancing system based on edge computing according to claim 6, wherein when the LBP scheme module provides protection for each service, attempts are simultaneously made with the PP scheme module and the SP scheme module to find respective corresponding values of $\rho$, the value of $\rho$ is updated after a scheme module is applied, and eventually a scheme with the smallest value of $\rho$ is applied to provide protection for a user.

8. The FiWi network load balancing system based on edge computing according to claim 7, wherein the LBP scheme module is further configured to: determine whether all services in the network are protected: if all the services are protected, detect whether all services of all users in the network are protected, and if not, continue protecting an unprotected service by using the LBP scheme module.

9. The FiWi network load balancing system based on edge computing according to claim 8, wherein it is detected whether all the services of all the users in the network are protected: if all the services are protected, the process is terminated, and a final network resource utilization is found, or otherwise, a next user continues to be protected by using the LBP scheme module.

* * * * *